(12) United States Patent
Yasutomi (10) Patent No.: US 12,335,605 B2
(45) Date of Patent: Jun. 17, 2025

(54) IMAGE PROCESSING DEVICE, IMAGING DEVICE, METHOD FOR CONTROLLING IMAGE PROCESSING DEVICE, AND STORAGE MEDIUM

(71) Applicant: CANON KABUSHIKI KAISHA, Tokyo (JP)

(72) Inventor: Takeshi Yasutomi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 18/156,489

(22) Filed: Jan. 19, 2023

(65) Prior Publication Data
US 2023/0239564 A1   Jul. 27, 2023

(30) Foreign Application Priority Data
Jan. 26, 2022   (JP) .................................. 2022-010147

(51) Int. Cl.
*H04N 23/63*       (2023.01)
*H04N 5/265*       (2006.01)
*H04N 23/667*      (2023.01)

(52) U.S. Cl.
CPC ........... *H04N 23/633* (2023.01); *H04N 5/265* (2013.01); *H04N 23/667* (2023.01)

(58) Field of Classification Search
CPC ................................................. H04N 23/6845
See application file for complete search history.

(56) References Cited

U.S. PATENT DOCUMENTS

| | | | | |
|---|---|---|---|---|
| 7,742,080 B2 * | 6/2010 | Nakajima | .......... | H04N 1/32128 |
| | | | | 348/222.1 |
| 7,852,396 B2 * | 12/2010 | Narukawa | .......... | H04N 1/00477 |
| | | | | 348/333.05 |
| 2003/0063213 A1 * | 4/2003 | Poplin | ................ | H04N 23/70 |
| | | | | 348/E5.042 |
| 2012/0274830 A1 * | 11/2012 | Kameyama | ............ | H04N 25/58 |
| | | | | 348/E5.037 |
| 2015/0054977 A1 * | 2/2015 | Hozumi | ................. | H04N 23/64 |
| | | | | 348/222.1 |

FOREIGN PATENT DOCUMENTS

JP       2019-092018 A       6/2019

* cited by examiner

*Primary Examiner* — Cynthia Segura
(74) *Attorney, Agent, or Firm* — Cowan, Liebowitz & Latman, P.C.

(57) ABSTRACT

A digital camera includes: a display control unit that displays an image acquired by an imaging unit and setting values regarding the imaging on a display unit at the time of live-view image; and an image synthesis unit that synthesizes a plurality of images acquired by the imaging unit on the basis of the setting values, the display control unit displaying two or more setting values out of an exposure time per image out of the images to be synthesized, the number of images to be synthesized, and a total exposure time of the images to be synthesized, in an image synthesis mode in which a plurality of images are captured and synthesized.

19 Claims, 5 Drawing Sheets

IMAGE PROCESSING DEVICE, IMAGING DEVICE, METHOD FOR CONTROLLING IMAGE PROCESSING DEVICE, AND STORAGE MEDIUM

BACKGROUND OF THE INVENTION

Field of the Invention

The present invention relates to imaging on the assumption of synthesis of a plurality of images.

Description of the Related Art

In the related art, a technique of capturing a plurality of images with an exposure time of an imaging device split and then synthesizing the images is known. It is possible to curb noise even in imaging with high sensitivity, for example, by synthesizing images. Also, it is possible to generate images with reduced image blur by capturing a plurality of images at short shutter speeds and synthesizing them even in imaging in which shutter speeds are long and blur occurs in the images. Japanese Patent Application Laid-Open No. 2019-92018, discloses a technique of repeating imaging by performing exposure and outputs of image signals from a sensor at specific time intervals, synthesizing the images, thereby generating a synthesized image as an image corresponding to a predetermined exposure time, and displaying the image.

However, according to Japanese Patent Application Laid-Open No. 2019-92018, it is not possible to control the imaging by setting an exposure time of a single image as an original image of the synthesized image, the plurality of times the imaging is to be repeated, a time required to complete imaging of all the plurality of images as original images of the synthesized image, and the like to values desired by a person who captures the images. Since the amount of blur in a single image is expressed as it is in the synthesized image, it is important to control the degree of blur in the single image as an original image of the synthesized image even in imaging on the assumption of the synthesized image.

SUMMARY OF THE INVENTION

The present invention can improve convenience related to setting for imaging images to be synthesized.

An image processing device according to the present invention includes: a display control unit configured to display an image acquired by an imaging sensor and setting values regarding the imaging on a display at the time of live-view display; and a synthesis unit configured to synthesize a plurality of images captured by the imaging unit on the basis of the setting values. The display control unit displays two or more setting values out of an exposure time per image out of the images to be synthesized, the number of images to be synthesized, and a total exposure time of the images to be synthesized, in an image synthesis mode in which a plurality of images are captured and synthesized.

Further features of the present invention will become apparent from the following description of exemplary embodiments with reference to the attached drawings.

DESCRIPTION OF THE EMBODIMENTS

Figure 1:
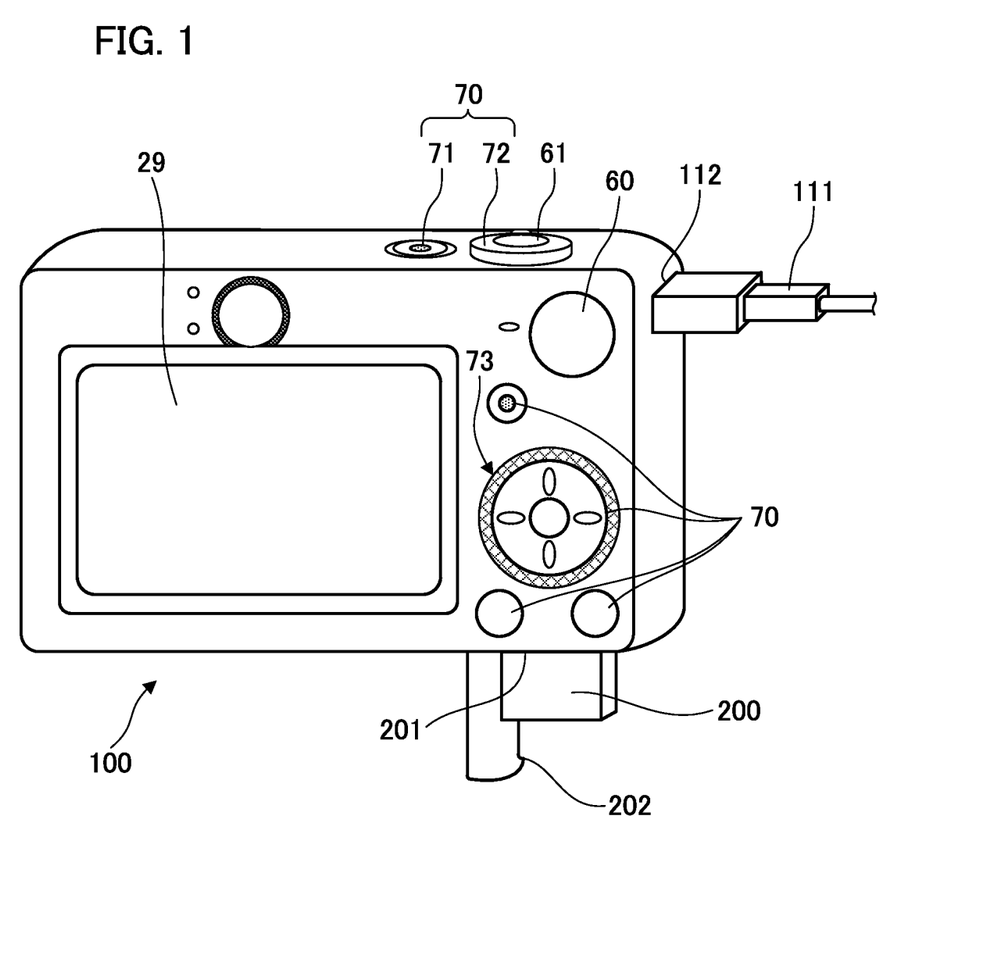
FIG. 1 is a diagram illustrating an appearance of a rear surface of an imaging device.
Figure 2:
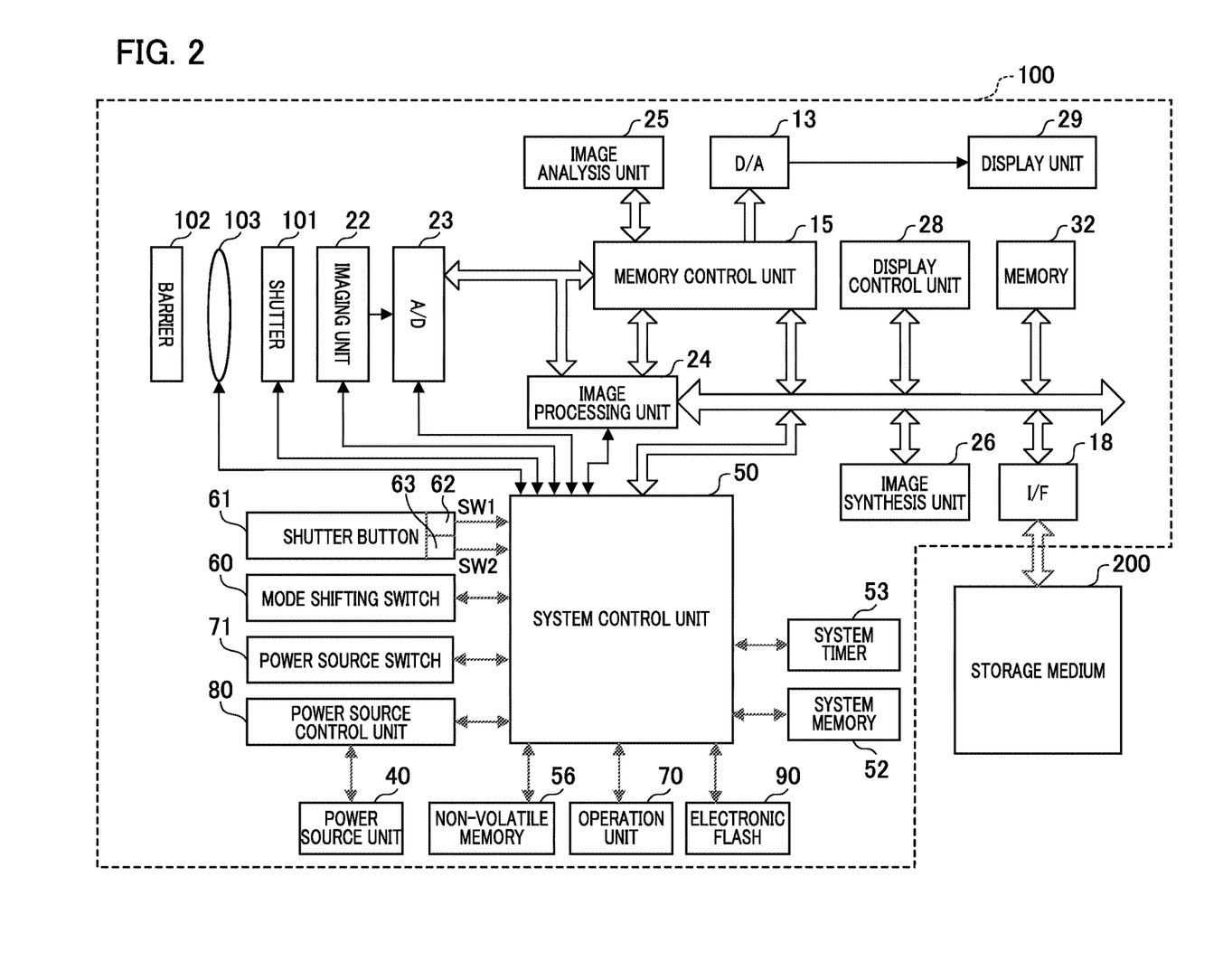
FIG. 2 is a diagram schematically illustrating a configuration of the imaging device.

A configuration of an imaging device will be described using FIGS. 1 and 2. FIG. 1 is a diagram illustrating an appearance of a rear surface of the imaging device. FIG. 2 is a block diagram illustrating a configuration of a digital camera 100. In the present embodiment, the digital camera 100 will be described as an example of the imaging device. The imaging device may be an imaging device in which a lens and a camera main body are integrated or may be an imaging device of a lens exchanging type in which a lens is detachably attached to a camera main body. Moreover, the imaging device to which the present embodiment is applied may be any electronic device including an imaging unit that performs imaging and a display unit that displays captured images, such as a PC, a smartphone, or a tablet terminal.

The digital camera 100 includes, on the rear surface, a display unit 29, a mode shifting switch 60, and a part of an operation unit 70. The display unit 29 is a display device (monitor) such as a liquid crystal device (LCD) and displays images and various kinds of information. Note that the display unit 29 may have a touch panel function of receiving a user's operations. The display unit 29 having the touch panel function can configure a GUI that appears to let the user directly operate an image on a screen displayed on the touch panel by associating display coordinates on the touch panel with input coordinates. Also, the display unit 29 may be a fixed monitor or may be a movable monitor such as a vari-angle (flow angle) monitor or a tilt monitor. The mode shifting switch 60 is an operation unit for shifting through various modes.

The operation unit 70 receives various operations from the user. The operation unit 70 includes operation members such as various switches and buttons. A function is appropriately allocated to each operation member of the operation unit 70 for each scene by selectively operating various functional icons displayed on the display unit 29, and the operation members act as various functional buttons. The functional buttons include, for example, an end button, a back button, an image forward button, a jump button, a narrowing-down button, an attribute change button, and the like. If the menu button is pressed, for example, a menu screen on which various settings can be made is displayed on the display unit 29. The user can intuitively perform various settings using the menu screen displayed on the display unit 29, a four-direction button for up, down, left and right directions, and a SET button.

The operation unit 70 includes a controller wheel 72 on the upper surface of the digital camera 100 and a controller wheel 73 on the rear surface of the digital camera 100. The controller wheel 72 and the controller wheel 73 are operation members included in the operation unit 70 such that a rotating operation can be performed thereon. The controller wheel 72 and the controller wheel 73 are used to indicate a selected item along with the direction button. If a rotating operation is performed on the controller wheel 72 or the controller wheel 73, an electrical pulse signal is generated in accordance with the amount of operation. It is possible to determine, from the pulse signal, an angle at which the rotation operation has been performed on the controller wheel 72 or the controller wheel 73, how many times the controller wheel has been rotated, and the like. The system control unit 50 controls each part of the digital camera 100 on the basis of the pulse signal in accordance with the rotating operation. Note that the controller wheel 72 and the controller wheel 73 may be any operation members as long as it is possible to detect their rotating operations. For example, the controller wheel 72 and the controller wheel 73 may be dial operation members that themselves rotate to generate pulse signals in response to a user's rotating operation. Also, the controller wheel 72 and the controller wheel 73 may be operation members configured of touch sensors and may be so-called touch wheels that themselves do not rotate but detect a rotating operation or the like performed by a user's finger.

The digital camera 100 includes, on its upper surface, a shutter button 61 and a part of the operation unit 70. The shutter button 61 is an operation unit for providing an instruction for imaging. A first shutter switch 62 and a second shutter switch 63 are stepwise switches that turn on and off in response to an operation performed on the shutter button 61. The first shutter switch 62 turns on in the course of an operation on the shutter button 61 provided in the digital camera 100, that is, by so-called half-pressing thereof (imaging preparation instruction), and generates a first shutter switch signal SW1. The system control unit 50 starts operations for automatic focusing (AF) processing, automatic exposure (AE) processing, automatic white balance (AWB) processing, and the like using the first shutter switch signal SW1. The second shutter switch 63 turns on by completing the operation performed on the shutter button 61, that is, by so-called full-pressing (imaging instruction), and generates a second shutter switch signal SW2. The system control unit 50 starts a series of imaging processing from reading of signals from the imaging unit 22 to writing of image data in a recording medium 200, using the second shutter switch signal SW2.

The operation unit 70 includes the aforementioned controller wheel 72 on the upper surface of the digital camera 100. A power source switch 71 is a power source switch for performing switching between power source ON and power source OFF. The digital camera 100 is activated by the user bringing the power source switch 71 into a power ON state. The controller wheel 72 is an operation member on which a rotating operation can be performed. The mode shifting switch 60, the shutter button 61, and the operation unit 70 are operation units for inputting various operation instructions to the system control unit 50.

The digital camera 100 includes, on its bottom surface, a recording medium slot 201 and a lid 202. The recording medium slot 201 is a slot for accommodating the recording medium 200. The recording medium 200 is a recording medium such as a memory card or a hard disk. The recording medium 200 accommodated in the recording medium slot 201 can communicate with the digital camera 100. The lid 202 is a lid for the recording medium slot 201. A recording medium OF 18 is an interface between the digital camera 100 and the recording medium 200.

The digital camera 100 includes a lens, an electronic flash 90, and the like on its front surface, which is not illustrated. The lens includes a barrier 102, an imaging lens 103, and a shutter 101. The barrier 102 prevents contamination and damage to an imaging optical system including the imaging lens 103, the shutter 101, and the imaging unit 22 by covering the imaging optical system. The imaging lens 103 is a lens group including a plurality of lenses such as a zoom lens, a focusing lens, and the like and forms an optical image of an object on an imaging element that the imaging unit 22 has. The shutter 101 is controlled by an instruction from the system control unit 50 and plays a role in adjusting an exposure time of the imaging unit 22. The shutter 101 is a focal plane shutter, for example. The electronic flash 90 is an electronic flash emitting light and compensating for shortage of the light amount in synchronization with the imaging instruction in a case where the field of view is dark, or the like.

Also, the digital camera 100 may include, on its side surface, a connector for establishing connection to a connection cable. The digital camera 100 can communicate with an external device connected to the other end of the connection cable via the connection cable connected to the connector. Note that the configuration in which the lens is included on the front surface and the display unit 29 is included on the rear surface is just an example, the lens and the display unit 29 may be included on the same surface as in a so-called in-camera of a smartphone, and any arrangement may be adopted.

The imaging unit 22 includes an imaging element that photoelectrically converts an optical image formed via an imaging optical system into an electrical signal, photoelectrically converts an optical image into an electrical signal, and acquires an image (image signal). The imaging element is an image sensor using a charge couple device (CCD) or a complementary metal oxide semiconductor (CMOS), for example. An A/D converter 23 converts an analog signal output by the imaging unit 22 into a digital signal. Output data of the A/D converter 23 is written in a memory 32 via an image processing unit 24 and a memory control unit 15 or via only the memory control unit 15.

The image processing unit 24 performs various kinds of image processing on image data output from the A/D converter 23 or the memory control unit 15. For example, the image processing unit 24 performs processing, as the image processing, pixel interpolation, resizing such as size reduction, color conversion processing, noise removal, demosaicing, luminance signal conversion, aberration correction, white balance adjustment, and the like. Also, the image processing unit 24 performs a predetermined arithmetic operation using the image data.

The system control unit 50 controls the entire digital camera 100. The system control unit 50 realizes various kinds of processing in the present embodiment, which will be described later, by executing a program recorded in a non-volatile memory 56. An example of control performed by the system control unit 50 will be described. The system control unit 50 performs control for imaging, such as exposure control and distance measurement control, on the basis of a result of the arithmetic operation performed by the image processing unit 24. The system control unit 50 executes, for example, automatic focusing (AF) processing of a through-the-lens (TTL) scheme, automatic white balance (AWB) processing of the TTL scheme, automatic exposure (AE) processing, and the like on the basis of the result of the arithmetic operation as imaging preparation operations.

Also, the system control unit 50 switches imaging modes in response to a signal from the mode shifting switch 60. The imaging modes include, for example, a stationary image capturing mode for capturing a stationary image, a video capturing mode for capturing a video, a reproduction mode for displaying the captured stationary image and video on a main display unit 11, and the like. The stationary image capturing mode includes a plurality of modes, for example, an automatic imaging mode, an automatic scene determination mode, a manual mode, various scene modes for image settings for different imaging scenes, a program AE mode, an image synthesis mode, a custom mode, and the like. The system control unit 50 is directly switched to any of these modes included in the stationary image capturing mode in response to an operation performed by the user on the mode shifting switch 60. Also, switching to any of these modes included in the stationary image capturing mode may be performed by the user switching the mode to the stationary image capturing mode once by the mode shifting switch 60 and then performing an operation on another operation member. Similarly, the video capturing mode may include a plurality of modes.

Note that, as the aforementioned image synthesis mode, various modes such as a mode for synthesizing a plurality of images and reducing noise, a mode for curbing influences of hand shaking, a mode for adding brightness, and a mode for generating an image that simulates long exposure in a pseudo manner, for example, are conceivable. These modes are not necessarily switched by the mode shifting switch 60. For example, ON and OFF of image synthesis may be switched by the user performing a menu operation or the like, or the system control unit 50 may perform switching to a mode for automatically synthesizing images in accordance with brightness of an object, for example. Alternatively, as a combination of these, the system control unit 50 may perform switching to a mode for automatically synthesizing images in accordance with a condition or the like of the object only in a case where the user turns on the image synthesis through a menu operation or the like. Note that the expression "image synthesis mode" will still be used below, but this is not limited to a mode defined in an explicit manner, and a state where an image synthesis function is being performed may mean that the image synthesis mode is working.

The image synthesis unit 26 performs processing for generating a synthesized image by synthesizing a plurality of images. Details of the image synthesis processing performed by the image synthesis unit 26 will be described later. An image analysis unit 25 analyzes an input image. The image analysis unit 25 performs object detection of detecting whether a specific object such as a person appears in an image, for example, scene determination, and the like and outputs results of analyzing the image to the image processing unit 24.

The memory 32 stores images captured by the imaging unit 22. Specifically, the memory 32 temporarily stores digital image data after conversion performed by the A/D converter 23 and image data for display which is to be displayed on the display unit 29. The image data includes moving image data and sound data in addition to stationary image data. The memory 32 has a storage capacity sufficient to store data of a plurality of number of stationary images, a moving image for a predetermined period of time, and sound. The memory control unit 15 controls writing of the image data in the memory 32 and reading of the image data from the memory 32.

A display control unit 28 controls display on the display unit 29. A D/A converter 13 converts the image data for display stored in the memory 32 into an analog signal and supplies the analog signal to the display unit 29. The display unit 29 performs display in accordance with the analog signal from the D/A converter 13 on an LCD or the like. In this manner, live-view display is performed by the D/A converter 13 converting a digital signal accumulated in the memory 32 into an analog signal and successively transferring the analog signal to the display unit 29 and by causing the display unit 29 to display the analog signal. The system control unit 50 performs display control by controlling the display control unit 28, the memory 32, the D/A converter 13, the display unit 29, and the like.

The non-volatile memory 56 is a memory that allows for electrical deletion and recording, such as an EEPROM. The non-volatile memory 56 stores constants for operations of the system control unit 50, programs, and the like. The system control unit 50 realizes various kinds of processing by executing the programs recorded in the non-volatile memory 56. A random access memory (RAM), for example, is used as the system memory 52, and constants and variables for operations of the system control unit 50, the programs read from the non-volatile memory 56, and the like are developed therein. A system timer 53 measures a time used to perform various kinds of control and a time of an incorporated clock.

A power source unit 40 includes a primary cell or a secondary cell, an AC adapter, and the like. The primary cell is, for example, an alkali battery, a lithium battery, or the like. The secondary cell is, for example, an NiCd battery, an NiMH battery, an Li battery, or the like. The power source control unit 80 performs power supply from the power source unit 40 to the digital camera 100. The power source control unit 80 includes a DC-DC converter, a switch circuit for switching a block to which power is to be distributed, and the like. Also, the power source control unit 80 detects presence/absence of attachment of a battery, the type of the battery, and the remaining amount of the battery. The power source control unit 80 controls the DC-DC converter therein in response to detection results regarding the battery and a command from the system control unit 50 and performs power supply to each part including the recording medium 200 at a necessary voltage for a necessary period of time, using an operation signal of the power source switch 71 as a trigger.

Next, an example of synthesis processing of synthesizing a plurality of pieces of image data in the image synthesis unit 26 will be described. As an example of the synthesis processing performed by the image synthesis unit 26, four types of processing, namely addition average synthesis processing, weighted addition synthesis processing, comparative light synthesis processing, and comparative dark synthesis processing will be described. It is assumed that each pixel value of image data before synthesis is $I\_i(x, y)$ (i=1 to N; x and y represent coordinates in the screen) and a pixel value of an image after synthesis of the N images is $I(x, y)$. Here, the pixel value may be a value of each of R, G1, G2, and B signals in a Bayer layout output from the image processing unit 24 or may be a value (luminance value) of a luminance signal obtained from a group of R, G1, G2, and B signals. Also, in regard to the luminance value, the signals of the Bayer layout may be subjected to interpolation processing such that R, G, and B signals are present in each pixel, and the luminance value may then be calculated for each pixel. As an equation for an arithmetic operation of the luminance value, there is a method of calculating it by weighted-adding the R, G, and B signals like $Y=0.3 \times R+0.59 \times G+0.11 \times B$ on the assumption that the luminance value is Y, for example.

Processing such as positioning is performed as needed among a plurality of pieces of image data, and the synthesis processing of each of associated pixel values is performed in accordance with the following equation. In other words, the addition average synthesis processing is performed in accordance with Equation (1) below.

$$I(x,y)=(I\_1(x,y)+I\_2(x,y)+ \ldots +I\_N(x,y)) \quad (1)$$

In the addition average synthesis processing, a result obtained by performing addition processing of pixel values of the N images for each pixel is the synthesized image data.

The weighted addition synthesis processing is performed using ak (k=1 to N) as a weighting coefficient in accordance with Equation (2) below.

$$I(x,y)=(a1{\times}I\_1(x,y)+a2{\times}I\_2(x,y)+ \ldots +aN{\times}I\_N(x,y))/N \quad (2)$$

In the weighted addition synthesis processing, a result obtained by performing weighted addition processing of pixel values of the N images for each pixel is the synthesized image data.

The comparative light synthesis processing is performed in accordance with Equation (3) below.

$$I(x,y)=\max(I\_1(x,y),I\_2(x,y), \ldots ,I\_N(x,y)) \quad (3)$$

In the comparative light synthesis processing, a result obtained by selecting a maximum value of the pixel values of the N images for each pixel is the synthesized image data.

The comparative dark synthesis processing is performed in accordance with Equation (4) below.

$$I(x,y)=\min(I\_1(x,y),I\_2(x,y), \ldots ,I\_N(x,y)) \quad (4)$$

In the comparative dark synthesis processing, a result of selecting a minimum value of the pixel values of the N images for each pixel is the synthesized image data. Note that the addition average synthesis processing, the weighted addition synthesis processing, the comparative light synthesis processing, and the comparative dark synthesis processing are examples of the synthesis processing executed by the image synthesis unit 26, and other synthesis processing for synthesizing a plurality of captured images may be performed.

Many digital cameras are designed by focusing on control of imaging conditions such as an aperture, a shutter speed, ISO sensitivity, and the like at the time of capturing one image. However, it is possible to assume that the image synthesis processing is performed as a part of imaging even in general imaging with an improvement in image processing ability per unit time of the image synthesis unit 26. In a case where setting of the number of captured images and the like in the image synthesis processing is performed in a currently commercially available digital camera, it is necessary for a user to operate a menu screen, open a setting screen for the synthesis processing, further select a functional icon or the like corresponding to an item to be set, and then perform setting. However, in a case where a synthesized image is generated, it may be necessary to control a plurality of conditions (setting values) at the same time. In such a case, it is significantly difficult to perform the setting method of selecting the setting item from the menu screen and changing the setting value at the same time with imaging at an appropriate timing without causing any problems in framing. In imaging in which imaging conditions changes moment by moment, a decisive moment may be missed if the operation unit 70 is operated a plurality of times to set/change settings such as the number of captured images. Thus, the present embodiment enables the user to simply and quickly check and set settings related to synthesis, such as an exposure time per image out of images to be synthesized, the number of captured images for synthesis, and a sum of exposure times (hereinafter, referred to as a total exposure time) of all the images to be synthesized.

Figure 3:
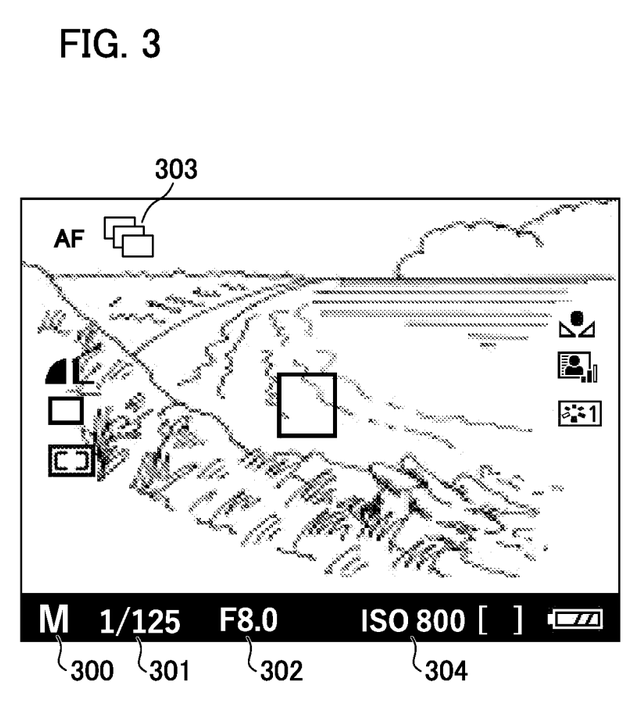
FIG. 3 is a diagram illustrating an example of display of a live view in the related art.
Figure 4:
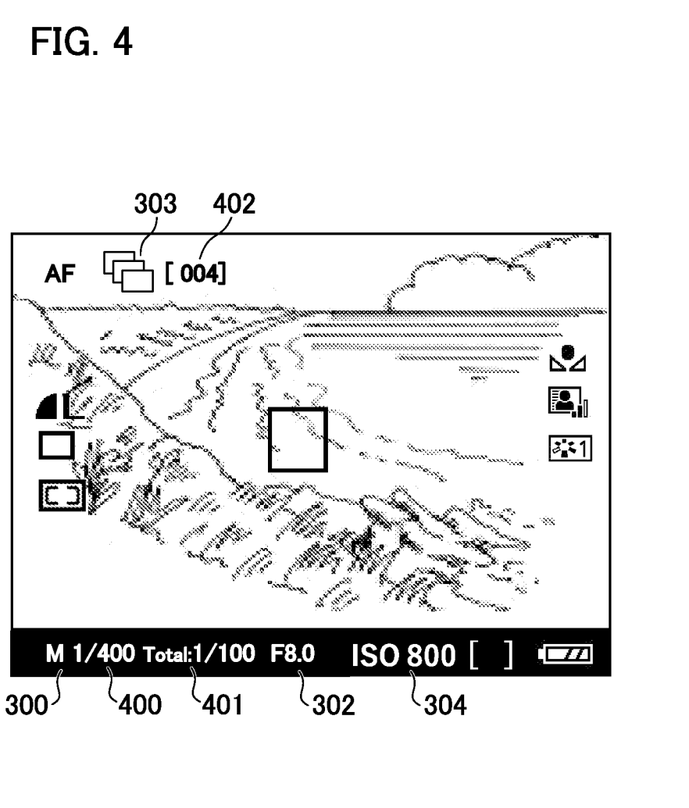
FIG. 4 is a diagram illustrating an example of display of a live view according to the present embodiment.

In the present embodiment, a GUI for simply and quickly setting settings related to synthesis including the exposure time per image out of the images to be synthesized, the number of captured images for synthesis, and the total exposure time of the images to be synthesized is displayed on the display unit 29 along with an image (through image) capturing the field of view. An example of a screen displayed on the display unit 29 at the time of live-view display in the image synthesis mode in which a plurality of images are captured and synthesized will be described using FIGS. 3 and 4. FIG. 3 is a diagram illustrating an example of a live-view screen in a case where an image synthesis mode in the related art is set. FIG. 4 is a diagram illustrating an example of a live-view screen in a case where the image synthesis mode according to the present embodiment is set. Note that the display on the display unit 29 is realized by the system control unit 50 controlling the display control unit 28, the memory 32, the D/A converter 13, the display unit 29, and the like.

Both the screens of live-view display illustrated in FIGS. 3 and 4 are displayed during preparation for imaging in the case where the image synthesis mode is set. Once the image synthesis mode is set, a manual mode in which each of an aperture, a shutter speed, and ISO can be set by a user's operation, for example, is set. Note that, the example in which the manual mode is set once the image synthesis mode is set has been described in FIGS. 3 and 4, a captured image synthesis mode may be selected from a menu mode after setting a program mode shutter speed priority mode in which some parameters are automatically set, an aperture priority mode, or the like.

In the stage of preparing for imaging, images (through image) capturing the field of view are sequentially displayed (live-view display) on the display unit 29. On the display unit 29, an imaging mode 300, a shutter speed 301 in the manual mode, an aperture 302, ISO 304, a synthesis mode icon display 303 indicating that the image synthesis mode has been set, and the like are displayed in addition to the through image as illustrated in FIG. 3 in the related art. On the other hand, the number of captured images for synthesis and the total exposure time of the images to be synthesized are not displayed. In this manner, the person who captures the images cannot easily recognize the number of captured images and the total exposure time derived therefrom in the display mode in the related art. In the case where the total exposure time is not displayed, it is not possible for the person who captures the images to recognize how long the person has to continue to hold the camera toward the field of view, and there may thus be a concern that the person significantly moves the digital camera 100 during imaging and it leads to a problem in synthesis processing after the imaging.

On the other hand, according to the present embodiment, the exposure time 400 per image out of images to be synthesized, the total exposure time 401, the number of captured images for synthesis 402 are also displayed in addition to the imaging mode 300, the aperture 302, the ISO 304, and the synthesis mode icon display 303 on the display unit 29 as illustrated in FIG. 4. In other words, according to the present embodiment, the setting values corresponding to the three setting items, namely the exposure time 400 per image out of images to be synthesized, the number of captured images for synthesis 402, and the total exposure time 401 of the images to be synthesized are displayed on the live-view screen in the image synthesis mode. Note that although the example in which all of the exposure time per image out of the images to be synthesized, the number of captured images, and the total exposure time are displayed has been described in the present embodiment, some of them, for example, only the total exposure time, or the exposure time per image and the number of captured images, may be displayed. Particularly, it is preferable to display two or more setting values out of the exposure time per image out of the images to be synthesized, the number of captured images, and the total exposure time. This is because it is possible for the user to recognize the remaining one through calculation if two of these three parameters are displayed. Also, although the example in which the imaging mode 300, the aperture 302, the ISO 304, and the synthesis mode icon display 303 are also displayed has been described, some or all of them may not be displayed. In this manner, it is possible to enable the user to simply and quickly check the settings related to synthesis by displaying the exposure time per image out of images to be synthesized, the number of captured images for synthesis, and the total exposure time of the images to be synthesized on the live-view screen in the image synthesis mode.

Also, the display in the image synthesis mode may be devised in accordance with the functions of the digital camera 100 and the imaging conditions. In a case where a numerical value that is equal to or greater than an upper limit value of the number of images that can be captured by the digital camera 100 (the number of continuously captured images) is set by the person who captures the images, display of the number of captured images 402 on the display unit 29 is emphasized. The emphasized display is performed by employing a display form such as blinking display, display with a color different from normal display, and display with a different color from that of other text displayed on the display unit 29. Also, in a case where the exposure time per image or the total exposure time exceeds the exposure time of a limit of blur correction determined in advance, for example, the exposure time per image or the total exposure time is displayed in an emphasized manner. In this manner, it is possible to encourage the person who captures the images to check and change the settings by notifying the person through the emphasized display of the corresponding setting in the case where the person sets the setting value that is equal to or greater than the setting value that can be set for the digital camera 100. It is thus possible to enable settings of appropriate setting values in imaging on the assumption of synthesis.

Next, a configuration and a method for enabling the user to quickly perform operation for setting without missing a shutter chance will be described in regard to the settings related to synthesis. In the related art, in a case where the number of captured images for synthesis or the like is to be changed in a state where a through image is being displayed, it is necessary to call a menu screen or the like by operating the operation unit 70 or the like, to select an item corresponding to the number of captured images, and to set the number of captured images or the like. There is a concern that desired imaging cannot be performed by missing a decisive moment or the like while setting the number of captured images or the like if the operation needs a procedure in this manner. Thus, the present embodiment enables the exposure time per image out of the images to be synthesized, the number of captured images for synthesis, and the total exposure time of the images to e synthesized to be changed directly on the live-view screen without calling the menu screen. Therefore, according to the present embodiment, setting functions for the exposure time per image and the number of captured images are allocated to the controller wheel 72 and the controller wheel 73, respectively, to enable direct operation without changing the screen.

Specifically, an operation for the exposure time per image out of the images to be synthesized is allocated to the controller wheel 72. For example, the exposure time per image is changed to the high-speed side by the person who captures the images rotating the controller wheel 72 rightward, and the exposure time per image is changed to the low-speed side by rotating the controller wheel 72 leftward. In other words, if the person who captures the images rotates the controller wheel 72 rightward, then the system control unit 50 shortens the exposure time per image in accordance with the amount of rotation. If the person who captures the images rotates the controller wheel 72 leftward, then the system control unit 50 extends the exposure time per image in accordance with the amount of rotation. Note that the combination of the rotation direction with the long and short shutter speeds may be opposite.

Also, an operation for the number of captured images for synthesis is allocated to the controller wheel 73. For example, the number of captured images changes in an increasing direction by the person who captures images rotating the controller wheel 73 rightward, and the exposure time per image is changed toward the low-speed side by rotating the controller wheel 73 leftward. In other words, if the person who captures the image rotates the controller wheel 73 rightward, the system control unit 50 increases the number of captured images in accordance with the amount of rotation. If the person who captures the images rotates the controller wheel 73 leftward, the system control unit 50 reduces the number of captured images per each synthesized image in accordance with the amount of rotation. Note that the combination of the rotation directions with the increase and the decrease in number of captured images may be opposite.

The exposure time per image out of the images to be synthesized and the number of captured images for synthesis are changed by an operation performed by the person who captures the images on the controller wheel 72 and the controller wheel 73, and the system control unit 50 dynamically updates the total exposure time on the basis of the changed values. Note that although the example in which the exposure time per image is allocated to the controller wheel 72 and the number of captured images is allocated to the controller wheel 73 has been described in the present embodiment, the present invention is not limited thereto, and the allocation of the exposure time and the number of captured images may be opposite. Also, the exposure time per image and the number of captured images may be allocated to another operation member. As in the above example, it is preferable that the operation member for updating the exposure time per image and the operation member for updating the total exposure time are allocated to separate members. In this manner, it is possible for the user to more intuitively and quickly change desired parameters. For example, shortening the exposure time per image is conceivable to minimize a sense of blur per image, and adjusting the total exposure time is conceivable to adjust a sense of blur in the entire synthesized image. With the above configuration, it is possible to further reflect such a user's intention.

Also, although the example in which the exposure time per image and the number of captured images are allocated to each controller wheel has been described in the present embodiment, any of the exposure time per image, the number of captured images, and the total exposure time may be allocated to the controller wheel. There is a correlation among the exposure time per image, the number of captured images, and the total exposure time, and the relationship represented by Equation (5) or (6) below is established. Equation (5) corresponds to a case where the total exposure time does not include a blanking period of the imaging element of the imaging unit 22, while Equation (6) corresponds to a case where the total exposure time includes the blanking period.

$$\text{Exposure time per image} \times \text{number of captured images} = \text{total exposure time} \quad (5)$$

$$(\text{Exposure time per image} + \text{blanking period of sensor}) \times \text{number of captured images} = \text{total exposure time} \quad (6)$$

In other words, if two of the three elements, namely the exposure time per image, the number of captured images, and the total exposure time are determined, then the remaining one element is determined. In other words, in a case where two setting values out of the exposure time per image out of the images to be synthesized, the number of images to be synthesized, and the total exposure time of the images to be synthesized are set, the system control unit 50 calculates the setting value of the remaining setting item that has not been set, on the basis of the two setting values. Therefore, if values of two items out of the exposure time per image, the number of captured images, and the total exposure time are determined by an operation performed by the person who captures the images, then the remaining one item is dynamically updated in accordance with the setting values.

Also, the exposure time per image, the number of captured images, and the total exposure time may be dynamically updated in accordance with the conditions of the captured field of view, that is, the brightness of the field of view, presence/absence of a moving object such as a person, a moving speed, and the like. The update timing is determined in conjunction with operations such as automatic focusing (AF) processing, automatic exposure (AE) processing, automatic white balance (AWB) processing, and the like after the first shutter switch 62 is pressed and the first shutter switch signal SW1 is generated, for example.

Figure 5:
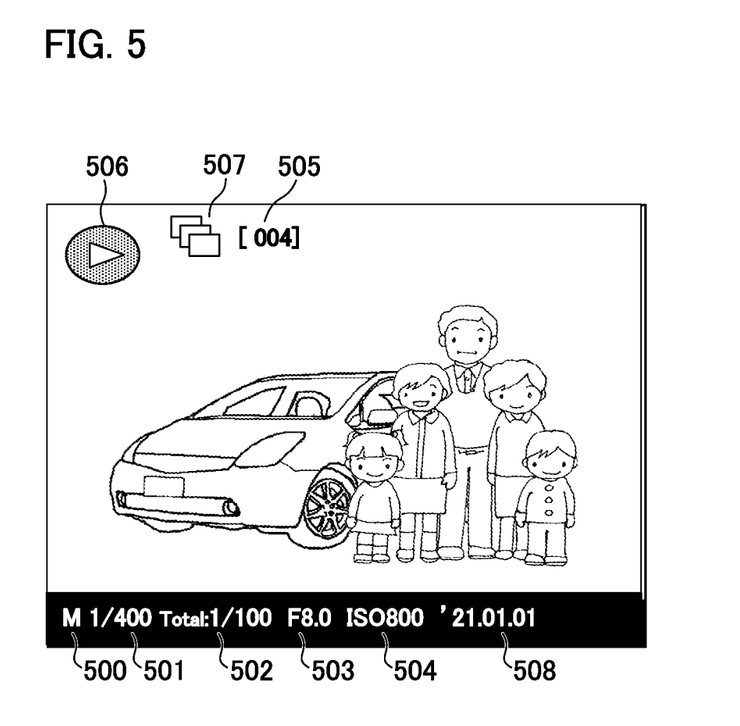
FIG. 5 is a diagram illustrating an example of display when a synthesized image is reproduced and displayed.

Next, a preferable reproduction display mode of a synthesized image will be described using FIG. 5. FIG. 5 is a diagram illustrating an example of display when a synthesized image is reproduced and displayed according to the present embodiment. When a synthesized image is displayed on the display unit 29, settings at the time of imaging and the synthesized image are displayed together along with a reproduction icon 506 indicating that the captured image is being reproduced and the date of imaging 508. As the settings at the time of imaging, the imaging mode 500 at the time of imaging, an icon 507 indicating that the image is obtained by synthesis, an exposure time 501 per image, a total exposure time 502, an aperture 503, ISO sensitivity 504, and the number of synthesized images 505 are displayed, for example. The settings at the time of imaging may be displayed in a superimposed manner on the synthesized image or may be displayed outside the synthesized image. It is possible for the person who captures the images to check the setting content and the results (the amount of noise generated in the image, the effect in accordance with the shutter speed, and the like) at the same time and to use it for the next imaging, by displaying the image after the synthesis and the settings used for the imaging at the same time. Note that although the example in which the imaging mode 500 at the time of imaging to the data of imaging 508 are displayed has been described in the present embodiment, some of them may be displayed. Note that, it is preferable to display the exposure time 501 per image and the total exposure time 502 at the same time in consideration of convenience of the person who captures the images.

Note that the example in which the imaging preparation screen for synthesis including the imaging preparation image and the setting values for synthesis imaging is displayed on the monitor 29 mounted in the rear surface of the digital camera 100 has been described in the present embodiment, the present invention is not limited thereto. For example, if the imaging device includes an electronic view finder (EVF), the imaging preparation screen for synthesis may be displayed on the EVF. It is possible to directly set the settings for synthesis such as the number of images to be synthesized by operating the operation unit 70 such as each controller wheel even in the case where the imaging preparation screen is displayed on the EVF. Also, in a case where the digital camera 100 is remotely operated by another device such as a smartphone connected to the digital camera 100, the imaging preparation screen for synthesis may be displayed on a screen that a person who captures images check for imaging.

As described above, according to the present embodiment, it is possible to simply and quickly check and set the exposure time per image out of images to be synthesized, the number of captured images, and the total exposure time and to improve convenience related to setting for capturing images to be synthesized. It is thus possible to reduce the concern that the person who captures the images misses a shutter chance and to enhance convenience of imaging on the assumption of synthesis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-010147, filed Jan. 26, 2022, which is hereby incorporated by reference wherein in its entirety.

What is claimed is:

1. An image processing device comprising
at least one processor and/or circuit configured to function as the following units:
 a display control unit configured to display an image acquired by an imaging sensor and setting values regarding the imaging on a display at the time of live-view display; and
 a synthesis unit configured to synthesize a plurality of images acquired by the imaging sensor on the basis of the setting values,
wherein the display control unit displays two or more setting values from among an exposure time per image out of the images to be synthesized, the number of images to be synthesized, and a total exposure time of the images to be synthesized, in an image synthesis mode in which a plurality of images are captured and synthesized, and
wherein the display control unit displays the setting values in an emphasized manner in a case where a setting value that is equal to or greater than a settable setting value has been set from among the setting values of the exposure time per image out of the images to be synthesized, the number of images to be synthesized, and the total exposure time of the images to be synthesized.

2. The image processing device according to claim 1, wherein the display control unit displays all the setting values of the exposure time per image out of the images to be synthesized, the number of images to be synthesized, and the total exposure time of the images to be synthesized, in the image synthesis mode.

3. The image processing device according to claim 1, wherein the display control unit displays the setting values when the plurality of images are captured for the synthesis at the time of displaying the images synthesized by the synthesis unit on the display.

4. The image processing device according to claim 1,
wherein at least one processor and/or circuit further functions as a control unit configured to control the imaging performed by the imaging sensor on the basis of the setting values, and
the control unit calculates a setting value of a setting item which has not been set, on the basis of the two setting values out of the exposure time per image out of the images to be synthesized, the number of images to be synthesized, and the total exposure time of the images to be synthesized in a case where the two setting values have been set.

5. The image processing device according to claim 1, wherein the total exposure time includes a blanking period.

6. The image processing device according to claim 1, wherein the total exposure time does not include a blanking period.

7. An image device comprising:
an imaging sensor that captures images;
a display; and
at least one processor and/or circuit configured to function as the following units:
 a display control unit configured to display an image acquired by an imaging sensor and setting values regarding the imaging on a display at the time of live-view display; and
 a synthesis unit configured to synthesize a plurality of images acquired by the imaging sensor on the basis of the setting values,
wherein the display control unit displays two or more setting values from among an exposure time per image out of the images to be synthesized, the number of images to be synthesized, and a total exposure time of the images to be synthesized, in an image synthesis mode in which a plurality of images are captured and synthesized, and
wherein the display control unit displays the setting values in an emphasized manner in a case where a setting value that is equal to or greater than a settable setting value has been set from among the setting values of the exposure time per image out of the images to be synthesized, the number of images to be synthesized, and the total exposure time of the images to be synthesized.

8. The imaging device according to claim 7,
wherein at least one processor and/or circuit further functions as:
 a first wheel configured to set the exposure time per image out of the images to be synthesized; and
 a second wheel configured to set the number of images to be synthesized, and
the display control unit displays at least the setting values for the exposure time per image out of the images to be synthesized and the number of images to be synthesized at the time of live-view display in the image synthesis mode.

9. The imaging device according to claim 7,
wherein at least one processor and/or circuit further functions as:
 a first wheel configured to set the exposure time per image out of the images to be synthesized; and
 a second wheel configured to set the total exposure time of the images to be synthesized, and
the display control unit displays at least the setting values for the exposure time per image out of the images to be synthesized and the total exposure time of the images to be synthesized at the time of live-view display in the image synthesis mode.

10. The imaging device according to claim 7,
wherein at least one processor and/or circuit further functions as:
 a first wheel configured to set the total exposure time of the images to be synthesized; and
 a second wheel configured to set the number of images to be synthesized, and
the display control unit displays at least the setting values for the total exposure time of the images to be synthesized and the number of images to be synthesized at the time of live-view display in the image synthesis mode.

11. A method for controlling an image processing device, the method comprising:
displaying an image acquired by an imaging sensor and setting values regarding the imaging on a display at the time of live-view display;
synthesizing a plurality of images acquired by the imaging sensor on the basis of the setting values; and
wherein, at the time of displaying the setting values on the display, displaying two or more setting values out of an exposure time per image out of images to be synthesized, the number of images to be synthesized, and a total exposure time of the images to be synthesized, in an image synthesis mode in which a plurality of images are captured and synthesized, and wherein, at the time of displaying the setting values on the display, displaying the setting values in an emphasized manner in a case where a setting value that is equal to or greater than a settable setting value has been set from among the setting values of the exposure time per image out of the images to be synthesized, the number of images to be synthesized, and the total exposure time of the images to be synthesized.

12. A non-transitory storage medium storing a control program of an image processing device causing a computer to perform each step of a control method of the image processing device, the method comprising:

displaying an image acquired by an imaging sensor and setting values regarding the imaging on a display at the time of live-view display;

synthesizing a plurality of images acquired by the imaging sensor on the basis of the setting values; and wherein, at the time of displaying the setting values on the display, displaying two or more setting values out of an exposure time per image out of images to be synthesized, the number of images to be synthesized, and a total exposure time of the images to be synthesized, in an image synthesis mode in which a plurality of images are captured and synthesized, and wherein, at the time of displaying the setting values on the display, displaying the setting values in an emphasized manner in a case where a setting value that is equal to or greater than a settable setting value has been set from among the setting values of the exposure time per image out of the images to be synthesized, the number of images to be synthesized, and the total exposure time of the images to be synthesized.

13. An image processing device comprising at least one processor and/or circuit configured to function as the following units:
  a display control unit configured to display an image acquired by an imaging sensor and setting values regarding the imaging on a display at the time of live-view display;
  a control unit configured to control the imaging performed by the imaging sensor on the basis of the setting values; and
  a synthesis unit configured to synthesize a plurality of images acquired by the imaging sensor on the basis of the setting values, wherein the control unit calculates a setting value of a setting item which has not been set, on the basis of the two setting values out of the exposure time per image out of the images to be synthesized, the number of images to be synthesized, and the total exposure time of the images to be synthesized in a case where the two setting values have been set, and wherein the display control unit displays two or more setting values from among an exposure time per image out of the images to be synthesized, the number of images to be synthesized, and a total exposure time of the images to be synthesized, in an image synthesis mode in which a plurality of images are captured and synthesized.

14. An image device comprising:
an imaging sensor that captures images;
a display; and
at least one processor and/or circuit configured to function as the following units:
  a display control unit configured to display an image acquired by an imaging sensor and setting values regarding the imaging on a display at the time of live-view display;
  a control unit configured to control the imaging performed by the imaging sensor on the basis of the setting values; and
  a synthesis unit configured to synthesize a plurality of images acquired by the imaging sensor on the basis of the setting values, wherein the control unit calculates a setting value of a setting item which has not been set, on the basis of the two setting values out of the exposure time per image out of the images to be synthesized, the number of images to be synthesized, and the total exposure time of the images to be synthesized in a case where the two setting values have been set, and wherein the display control unit displays two or more setting values from among an exposure time per image out of the images to be synthesized, the number of images to be synthesized, and a total exposure time of the images to be synthesized, in an image synthesis mode in which a plurality of images are captured and synthesized.

15. The imaging device according to claim 14,
wherein at least one processor and/or circuit further functions as:
  a first wheel configured to set the exposure time per image out of the images to be synthesized; and
  a second wheel configured to set the number of images to be synthesized, and
the display control unit displays at least the setting values for the exposure time per image out of the images to be synthesized and the number of images to be synthesized at the time of live-view display in the image synthesis mode.

16. The imaging device according to claim 14,
wherein at least one processor and/or circuit further functions as:
  a first wheel configured to set the exposure time per image out of the images to be synthesized; and
  a second wheel configured to set the total exposure time of the images to be synthesized, and
the display control unit displays at least the setting values for the exposure time per image out of the images to be synthesized and the total exposure time of the images to be synthesized at the time of live-view display in the image synthesis mode.

17. The imaging device according to claim 14,
wherein at least one processor and/or circuit further functions as:
  a first wheel configured to set the total exposure time of the images to be synthesized; and
  a second wheel configured to set the number of images to be synthesized, and
the display control unit displays at least the setting values for the total exposure time of the images to be synthesized and the number of images to be synthesized at the time of live-view display in the image synthesis mode.

18. A method for controlling an image processing device, the method comprising:
displaying an image acquired by an imaging sensor and setting values regarding the imaging on a display at the time of live-view display;

controlling the imaging performed by the imaging sensor on the basis of the setting values; and synthesizing a plurality of images acquired by the imaging sensor on the basis of the setting values, wherein, in the controlling, calculating a setting value of a setting item which has not been set, on the basis of the two setting values out of the exposure time per image out of the images to be synthesized, the number of images to be synthesized, and the total exposure time of the images to be synthesized in a case where the two setting values have been set, and wherein, at the time of displaying the setting values on the display, displaying two or more setting values out of an exposure time per image out of images to be synthesized, the number of images to be synthesized, and a total exposure time of the images to be synthesized, in an image synthesis mode in which a plurality of images are captured and synthesized.

19. A non-transitory storage medium storing a control program of an image processing device causing a computer to perform each step of a control method of the image processing device, the method comprising:

displaying an image acquired by an imaging sensor and setting values regarding the imaging on a display at the time of live-view display;

controlling the imaging performed by the imaging sensor on the basis of the setting values; and synthesizing a plurality of images acquired by the imaging sensor on the basis of the setting values, wherein, in the controlling, calculating a setting value of a setting item which has not been set, on the basis of the two setting values out of the exposure time per image out of the images to be synthesized, the number of images to be synthesized, and the total exposure time of the images to be synthesized in a case where the two setting values have been set, and wherein, at the time of displaying the setting values on the display, displaying two or more setting values out of an exposure time per image out of images to be synthesized, the number of images to be synthesized, and a total exposure time of the images to be synthesized, in an image synthesis mode in which a plurality of images are captured and synthesized.

\* \* \* \* \*